Oct. 13, 1970 K. JOHANSEN ET AL 3,534,174

ANALYZER FOR AUTOMATIC TELEPHONE EXCHANGES

Filed Oct. 26, 1966 2 Sheets-Sheet 1

INVENTORS
Knut Johansen
Sven Gustav Ingemar Kilander
Per Olof Olsson
BY
Hane and Nydick
ATTORNEYS

ANALYZER FOR AUTOMATIC TELEPHONE EXCHANGES

Filed Oct. 26, 1966 2 Sheets-Sheet 2

INVENTORS
Knut Johansen
Sven Gustav Ingemar Kilman
Per Olof Olsson
BY Hane and Nydick
ATTORNEYS United States Patent Office 3,534,174
Patented Oct. 13, 1970

3,534,174
ANALYZER FOR AUTOMATIC TELEPHONE EXCHANGES

Knut Johansen, Huddinge, Sven Gustav Ingemar Kilander, Stuvsta, and Per Olof Olsson, Hagersten, Sweden, assignors to Telefonaktiebolaget L M Ericsson, Stockholm, Sweden, a corporation of Sweden Filed Oct. 26, 1966, Ser. No. 589,580
Claims priority, application Sweden, Nov. 9, 1965, 14,432/65
Int. Cl. H04q *3/47;* H04m *3/50*
U.S. Cl. 179—18 3 Claims

ABSTRACT OF THE DISCLOSURE

In a telephone exchange there is a number translator comprising a control device which receives a line equipment number from a register and causes a line selector to transmit a pulse to an indicated point on one side of a distribution frame. The pulse is transmitted via a jumper wire to another point on the frame to which is connected a test winding which pulses a coded combination of magnetic cores in the translator. In response thereto the translator transmits back to the register the directory number associated with the line equipment number. Electromagnetically coupled to the test winding is a two-state magnetic core which is switchable between the states in response to the polarity of current pulses through the test winding. When the two-state magnetic core switches in a particular direction an indication is given that the call is to be handled in a special manner such as by an intercept operator.

The present invention refers to automatic telephone exchanges and concerns a combined translator and analyzer for the writing, reading and cancellation of one or more markings valid individually for a line connected to the exchange. In telephone exchanges translators are used for determining by means of a subscriber's number registered in a register, the position of a called line in the subscribers' multiple of the exchange. The lines connected to the exchange are each provided with a test wire in the translator. The translator contains magnetic annular cores, reading wires for the annular cores and registering means. The test wires are passed through annular cores necessary for the translation. During the translation of a number the test wire of the line is fed a pulse having a certain current polarity from a pulse generator. The translator generally converts the directory number of a called line into data, corresponding to the grouping system used in the telephone exchange. The data is determined by the selecting devices of the telephone exchange, but can also be used to determine the directory number of the line by means of the position of a line in the subscribers' multiple.

An object of the invention is to mark in connection with a translation of the multiple position of a subscriber's number, further data for the line intended. Such further data can be, for example, that the line is vacant, closed to chargeable calls, connected to interception service or the like.

The invention satisfies this object by apparatus which comprises at least one particular annular core of magnetic material with a substantially rectangular hysteresis loop through which the test wire of the line is passed, and by means of a reading wire common to many lines and passed through the particular annular core and connected to an indicator in the registering means of the translator. The apparatus further includes means in a pulse generator which sends out, during translation for causing operation of the indicator, a pulse with a polarity opposite to a test pulse, and means which write a change of the marking for the line by producing a pulse through the test wire of the line, having such a polarity that the existing field direction in the particular annular core is reversed.

The invention will be described by means of the accompanying drawings, FIGS. 1–2.

Figure 1:
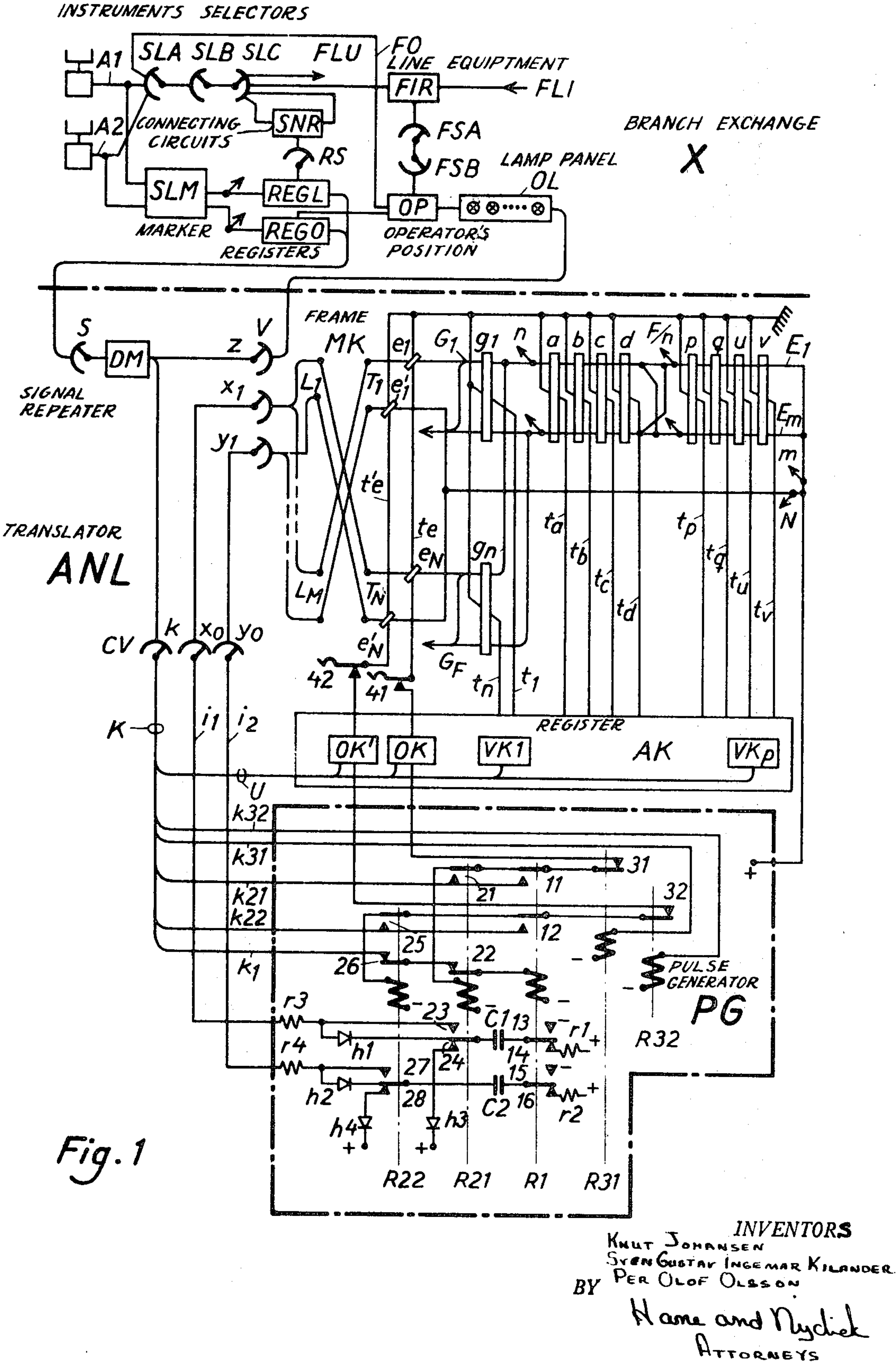
FIG. 1 shows a circuit diagram of an embodiment according to the invention particularly intended for interception service in a private branch exchange.

In FIG. 1, X is a private automatic branch exchange, ANL a translator with selectors S and V, and PG is a pulse generator. In the private branch exchange, A1 and A2 are subscriber's lines connected to subscriber's instruments; SLA, SLB, SLC selector devices, and FLI and FLU incoming and outgoing exchange lines, respectively. For local traffic within the private branch exchange there are provided connecting circuits SNR by means of which register finders RS can be connected to registers REGL for local connections. The incoming exchange lines FLI have line equipments FIR which by means of selectors FSA, FSB are connected to an operator's equipment OP at incoming calls from the exchange line FLI. To the selector devices SLA, SLB, SLC belong at least one marker SLM. To the operator's equipment OP belong a line FO, a lamp panel OL with relays for the registration of lamp signals for number indication and a register REGO for the connection of telephone communications, particularly incoming calls from line subscribers FLI to A1, A2 and other lines.

The directory numbers of the subscriber's instruments A1, A2, etc., are assumed to be arbitrarily selected and the connection between the directory numbers and the multiple positions of the subscriber's instruments in the selectors SLA are determined by the intermediate distribution frame MK in the translator ANL. The registers REGL and REGO are connected to translator ANL during each call to one of the subscriber's instruments A1, A2, etc. The connection is carried out by means of selector devices S, V, CV and signal repeaters DM. A number of signal repeaters or control devices DM corresponding to the requirements of the traffic is provided.

The translator comprises: magnetic annular cores *gl, gn, a–d, p–v,* which are common to subscribers' line groups of unequal size, and have no remanence, annular cores $e_1$–$e_N$, $e'_1$–$e'_N$, each of which is individual for some subscriber's line and made of magnetic material having a substantially rectangular hysteresis loop, and an intermediate distribution frame MK and a registering means AK consisting of electronic bistable circuits VK1–VK*p*, OK, and OK'. The intermediate distribution frame MK has a directory number side for number wires $L_1$–$L_M$ and a multiple position side for test wires $T_1$–$T_N$ with two wire connections for each directory number to each multiple position, respectively. Besides the number translation, two individual markings may be obtained for each subscriber's instrument A1, A2 by means of a wire pair $L_1$–$L_M$, $T_1$–$T_N$ for each subscriber's instrument. To the number wires $L_1$–$L_M$ are connected pulse wires $i_1$ and $i_2$ by means of the selectors CV and V. Of the test wires $T_1$–$T_N$ one in each pair is passed through a detached individual annular core $e'_1$–$e'_N$. Each of the other test wires $T_1$–$T_N$ is passed through its separate individual annular core $e_1$–$e_N$ and is then brought together to *n* main groups and to F subgroups $G_1$–$G_F$, each having *m* test wires in each subgroup, and the test wires of a number F/*n* of subgroups forming a main group which is passed through an annular core *gl–gn* for marking of the main group during a translation. The subgroups within each main group are numbered 1–F/*n* and the test wires in different main groups which belong to subgroups having the same number are interconnected mutually and with test wires which are passed through annular cores in the group *a–d* and form F/*n* groups, each having *m* test wires. The annular cores *a–d* form F/*n* combinations and to each combination corresponds a subgroup. The test wires in each subgroup are numbered **1–*m*** and the test wires in different subgroups which have the same number or unit are interconnected mutually and with a test wire $E_1$–$E_m$ which is passed through annular cores in the group *p–v*. With the annular cores *p–v, m* combinations are formed.

From the annular cores *gl–gn, a–d, p–v r*eading wires $t_1$–$t_n$, $t_a$–$t_d$, $t_p$–$t_v$ lead to the registering means AK. From the individual annular cores $e_1$–$e_N$ and $e'_1$–$e_N$ respectively reading wires $t_e$ and $t'_e$ respectively lead to electronic bistable circuits OK, OK′.

The pulse generator PG consists of capacitors $C_1$, $C_2$ which are charged and discharged and connected to the pulse wires $i_1$ and $i_2$ by means of electromagnetic relays R1, R21, R22, R31, R32.

A call from, for example, the instrument A1 is connected by means of the marker SLM through the selector devices SLA, SLB, SLC, a connecting circuit SNR and a register finder RS to a register REGL. The subscriber hears the exchange and dials the directory number of, for example, the subscriber's instrument A2. The register connects itself to a signal repeater DM by means of a selector S and transmits signals which set the selector device V belonging to the signal repeater to a position corresponding to the directory number of subscriber A2. The selecting device CV which can be a rotary selector but suitably is a relay chain in which only one relay at a time can be operated, is operated from signal repeater DM, so that the pulse wires $i_1$, $i_2$ of the pulse generator PG are connected to the selector contacts *x*1, *y*1 and the wires U and R of the registering means AK for output signals, and the signal wires *k*1, *k*21, *k*22, *k*31, *k*32 of pulse generator PG are connected to the signal repeater DM.

In a circuit passing from repeater DM through a contact device *k* in the selector CV and a wire *k*1 in the bundle of wires K and the contacts 26, 22, the relay R1 in the pulse generator will be operated. The contacts 11–16 are actuated. Each of the capacitors C1 and C2 is discharged in one of the two following circuits: + voltage, one of the test wires $E_1$–$E_m$ through the annular cores *p–v*, a test wire through the annular cores *a–d*, an individual test wire, for example through the wire in the pair of wires T1 through the annular core $e_1$, frame MK, lines *x*1, *x*0, and $i_1$, the resistance *r*3, the rectifier *b*1, capacitor C1, the contact 13, to a negative voltage, and an individual annular core, for example $e'_1$, lines *y*1, *y*0, and $i_2$, the resistance *r*4, the rectifier *h*2, capacitor C2, the contact 15, to a negative voltage. Here it is presupposed that there is no marking for the called subscriber's instrument A2, i.e. the annular core $e_1$ and $e'_1$ respectively are magnetized according to the direction of the current. The bistable circuits OK and OK′ are not activated but bistables VK1–VK*p* in register AK receives a signal from one of the reading wires $t_1$–$t_n$, at least one signal from the reading wires $t_a$–$t_d$ and at least one signal from the reading wires $t_p$–$t_v$. These signals are repeated and fed by wires in the bundles of wires U and K and contacts in the contact device *k* to the signal repeater DM. Then the selector CV and the pulse generator PG are released. The capacitors C1 and C2 are discharged by the contacts 14, 24 and 16, 28 respectively, the resistances *r*1, *r*2 and the rectifiers *h*3, *h*4. The signals to repeater DM indicate data for the multiple position of the line A2 and are conducted from repeater DM through selector S to the register REGL and then units S, DM and V will be released.

The register REGL is connected to the marker SLM and data for the multiple position of instrument A2 are transmitted from register REGL to marker SLM. The marker connects the subscriber's instrument A2 by means of selectors SLA, SLB, SLC to the output side of the connecting circuit SNR whose input side is connected to the instrument A1. The register REGL and the marker SLM are released. A telephone connection has thus been made between instruments A1 and A2 by means of the directory number of instrument A2.

Outgoing calls from the private branch exchange X are connetced by means of the digit 0. During an outgoing call from, for example, the subscriber's instrument A1 the calling instrument is connected, as has been described, to a connecting circuit SNR and to a register REGL. When the digit 0 is received in register REGL the register will be connected to the marker SLM that selects a free outgoing exchange line FLU, and connects it to instrument A1 by means of selectors SLA, SLB, SLC. At the same time units REGL and SNR are released.

Incoming calls from the exchange lines FLI are connected to an operator's position OP by means of particular selectors FSA, FSB. The operator then sets her register REGO in conformity to the directory number of that subscriber's instrument, for example A2, to which the incoming call is to be connected. The register REGO is connected by means of selector S to signal repeater DM and transmits signals which set the selecting device V belonging to repeater DM to a position corresponding to the directory number of instrument A2. The translator ANL then works in the same way as at local connections according to the description above for calls from instruments A1 to A2. The marker SLM receives signals from register REGO which indicate the multiple position of instrument A2 and connects a telephone communication between instrument A2 and the line equipment FIR of the calling exchange line FLI by means of selectors SLA, SLB, SLC.

If the subscriber at instrument A1 wishes to have interception service, i.e. that all calls to the instrument A1 shall be answered by an operator, for example the operator in the operator's equipment OP, the subscriber orders interception service by means of a call to the line FO. Calls to this line are answered by that operator who is to perform the duties of the interception service, and is informed of the directory number of the subscriber's instrument A1. The operator calls the directory number of instrument A1, preceded by a particular prefix that shows that instrument A1 is to be connected for interception service. The numbers are registered in the register REGO which will connect itself to the translator ANL. A signal corresponding to the prefix is sent through selector S to the signal repeater DM simultaneously as the selector V is set to the position corresponding to the catalogue number of instrument A1. The pulse generator PG is connected by means of the selecting device CV and the relay R1 is operated as has been described above. The contacts 11–16 are actuated and a pulse is sent on the wires $i_1$ and $i_2$. These pulses are of no importance in this case.

Because of the prefix registered in repeater DM a circuit is closed through the wire K21, contact 11 and the winding of relay R21. The relay R21 operates in this circuit. During the operating time of relay R21 the pulses through the wires $i_1$ and $i_2$ have time to be terminated. The contacts 21–24 are actuated. The current passing through the winding of relay R1 is interrupted by the contact 22 and relay R1 releases its armature. The relay 21 is kept operated by the contact 22. The capacitor C1 discharges in the following circuit: positive source +, the resistance *r*1, capacitor C1, the contact 23, the resistance *r*3, the wires $i_1$, *x*0, and *x*1, frame MK, the test wire of instrument A1, for example in the wire pair $T_N$ that passes through the annular cores $e_N$ *gn, c, d, u, v*, the wire $E_m$ to positive source +. The discharge of the capacitor C1 implies that the annular core $e_N$ that consists of a material with high remanence, is reversely magnetized.

In the signal repeater DM the circuit is tested through the wire K1, contacts 26 and 22 and the winding of relay R1. When this circuit is interrupted by the contact 22, units CV and PG will be released so that the translator may be used for another call, connected by another signal repeater DM.

From repeater DM there is signalled to register REGO that the interception service marking has been carried out and then units S and DM will be released. The operator obtains a particular signal from register REGO, for example a buzzer tone.

For all calls to the subscriber's instrument A1 following thereafter a particular signal will be obtained in connection with the translation of the directory number of instrument A1. A signal repeater DM is connected to that register which has received the catalogue number. The selector V belonging to the signal repeater is set and the pulse generator PG is connected. The pulse that is sent by the wire $i_1$ when the capacitor C1 is charged, remagnetizes the annular core $e_N$. Then a voltage is induced in the reading wire $t_e$ and the bistable circuit OK is activated in a circuit from ground through wire $t_e$ and the blocking button 41 simultaneously with the bistable circuits VK1–VK*p* that are activated from the reading wires $t_1$–$t_n$, $t_a$–$t_d$, $t_p$–$t_v$ and which indicate the multiple position of the called instrument A1. By means of wires in the bundles of wires U and K the signals obtained at the translation are transmitted from the registering device AK to the signal repeater DM and the registers REGL and REGO, respectively. Simultaneously a circuit will be completed from the bistable circuit OK through the contact 31 and the winding of relay R21. The contacts 21–24 are actuated and a second pulse is sent by the wire $i_1$ by discharging the capacitor C1 in the above-described circuit through the contacts 14 and 23 when the relay R1 releases its armature. This pulse rewrites the particular marking of the instrument A1 by reversing again the direction of the magnetic field in the annular core $e_N$. Then the pulse generator PG and the selector device CV will be released.

From the signal repeater DM a marking is sent by the wire Z and the selector V to the lamp panel OL where one or more lamps light up and indicate the number of the called line A1. The register REGL or REGO connects a telephone communication between the calling line, for example A2 or an exchange line FLI and the connection FO. Then the register and the signal repeater DM are released. The call has thus been connected to the interception service in the operator's equipment OP and in the lamp panel OL the directory number of the called instrument A1 has been registered. From the interception service board the call can be answered and transferred to an arbitrary subscriber's instrument in the private branch exchange X. By means of the blocking button 41 the interception service marking can be disconnected, for example if a call to a line marked for interception service is desired.

The cancellation of the interception service marking is carried out from the interception service board by means of a call to the line in question, for example subscriber line A1, the directory number of the subscriber's instrument A1 being preceded by a particular prefix. After the registering of the prefix and the directory number in the register REGO the translator ANL is connected by means of a selector S and a signal repeater DM that receives the prefix simultaneously as the selector V is set in accordance with the directory number. The pulse generator PG is connected to the signal repeater DM by means of the contact devices *k*, *x*0, *y*0 in the selector device CV. In a circuit through the wire *k*31 the relay R31 is operated simultaneously as the relay R1 operates. The contacts 31 and 11–16 are actuated. As the called line A1 is connected for interception service the bistable circuit OK will be activated when a pulse through the wire $i_1$ is sent from pulse generator PG at the charging of capacitor C1 but no signal will be obtained by the relay R21 when the contact 31 is actuated. The interception service marking will thus not be rewritten after the translation. The annular core $e_N$ obtains no pulse for reverse magnetization when the capacitor C1 is discharged. For succeeding calls to the directory number of the line A1 the bistable circuit OK will not be activated.

If more markings that are independent of each other are desired in connection with a number translation, many parallel analyzing circuits can be arranged. In the figure, means for two circuits are shown: elements C1, *r*3, $i_1$, *x*0, *x*1, *e*1–$e_n$ and so on and units C2, *r*4, *i*0, *y*1, *e*1'–$e_N'$ respectively. In whichever of the annular cores $e_1'$–$e_N'$ a marking, that is individual for the respective directory number, can be written and then at any time be cancelled by means of signals on the wires *k*22 and *k*32, respectively, in full conformity to what has been described above for interception service marking. Thus the test wires of the annular cores *e*1–$e'_N$ can be passed through annular cores for number translation corresponding to the annular cores *g*1–$g_n$, *a–d*, *p–v* in a second setting of annular cores without remanence and having reading wires connected to a second registering device VK1–VK*p*. By means of the bistable circuits OK and OK' it is indicated which translator is to be connected to the signal repeater DM. If the multiple position corresponding to circuits OK is the multiple position of the called subscriber's instrument the multiple position corresponding to circuit OK' can be valid for a subscriber's instrument to which the calls are transferred occasionally, for example the telephone instrument of a secretary. Changes between the two subscribers' instruments are carried out by the directory number of the main instrument preceded by the above-mentioned prefixes.

The invention can obviously be designed in many different ways. In telephone exchanges where the directory number of a calling line is automatically identified and registered in that register to which the call is connected, the directory number of the calling person does not need to be sent in connection with a switching to, for example, interception service or a secretary, but only the prefix characteristic for the connection is required when a subscriber himself carries out the writing and the cancellation, respectively.

Figure 2:
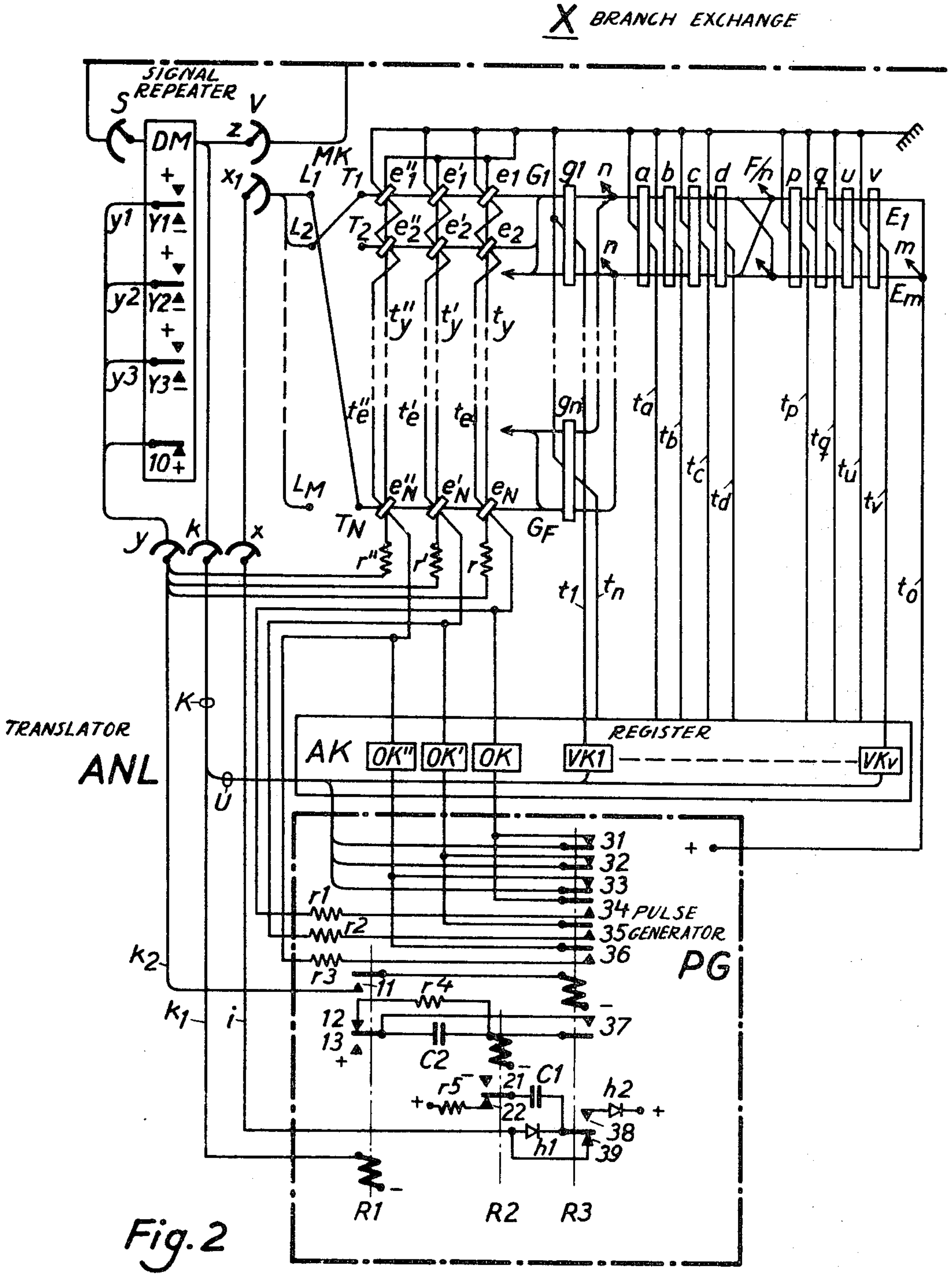
FIG. 2 shows another embodiment.

In FIG. 2 is shown an embodiment of the invention in which all the annular cores of the translator are made of ferrite or a magnetic material having a substantially rectangular hysteresis loop. The private branch exchange X corresponds completely to the description above of FIG. 1.

In FIG. 2 there is shown a translator ANL with connecting means S, a number of signal repeaters DM having each its own marking conductor V, a pulse generator PG and an intermediate distribution frame MK and ferrite rings $g_1$–$g_n$, *a–d*, *p–v*, $e_1$–$e''_1$, $e_2$–$e''_2$ . . . $e_N$–$e''_N$ and a registering device AK consisting of electronic bistable circuits VK1–VK*v*, OK–OK''. The bistable circuits are such that circuits VK1–VK*v* are activated by voltages that are induced in the readingw ires $t_e$–$t''_e$ by pulses sent out sent out from pulse generator PG with the one current direction while circuits OK–OK'' are activated by voltages induced in the reading wires $t_e$–$t_e''$ by pulses sent out from pulse generator PG with the opposite current direction. The wire threading through the annular cores corresponds to the description above of FIG. 1. The pulse generator PG and the registering means AK are connected to the signal repeater DM by means of the selecting device CV and circuits not shown in the figure as they are of no importance for the invention.

For each directory number there is provided only one number wire $L_1$–$L_M$ and for each multiple position only one test wire $T_1$–$T_N$ in the intermediate distribution frame MK.

For each test wire $T_1$, $T_2$ . . . $T_N$ there are three individual annular cores, for example, $e_N$, $e'_N$, $e''_N$ for test wire $T_N$. Each number wire corresponding to a subscriber is in the intermediate distribution frame MK connected to a test wire that corresponds to a multiple position in the private branch exchange. In the figure for example, $L_1$ is connected to $T_N$ and $L_2$ is connected to $T_1$.

When a register REGL or REGO of FIG. 1 has registered a called subscriber's directory number the register will be connected by means of the selecting device S to a signal repeater DM. The marking conductor V is set by means of signals from the register so that a circuit is obtained by means of the contact means $x1$ to the number wire, for example L1, corresponding to the directory number. This is effected by means of circuits which are of no importance for the invention and which are of the conventional kind. Then repeater DM is connected to the registering device AK which is common to all or to a group of signal repeaters and to the generator PG by means of contact devices $k$, $x$, $y$ belonging to the selecting device CV. The relay operates in a circuit passing through the wire $k1$ and the contact device $k$. The contacts 11–13 are actuated. The relay R2 operates in a circuit passing through the contact 13, the capacitor C2, the winding of relay R2, and then the relay R2 is kept operated during the charging time of the capacitor. The contacts 21–22 are actuated and the following circuit is completed: positive source +, the wire $t_o$, one of the wires E1–E$m$, a wire in one of the bundles of wires in the annular cores $a$–$d$, the test wire $T_N$ of the bundles of wires $G_F$, frame MK, line L1, contacts $x1$, $x$, the wire $i$, the contact 39, the capacitor C1, the contact 21 to a negative source. A first pulse passes said circuit during the charging time of the capacitor C1. When the capacitor C2 is fully charged, the relay R2 will release its armature and the contacts 21–22 are restored. The capacitor C1 is discharged by means of the resistance $r5$ and the contact 22 and the described circuit, and a pulse having an opposite current direction to said first pulse passing the circuit. During the first pulse the field direction is reversed in some annular cores $g1$–$gn$, $a$–$d$, $p$–$v$ which does not imply activation of any of the bistable circuits VK1–VK$v$. The first pulse reverses the field direction also in those annular cores $e_N$–$e''_N$ which do not show any particular marking, the corresponding circuits OK–OK″ being activated. If one of the last-mentioned bistable circuits, for example OK, is not activated, this implies that the corresponding ferrite ring $e_N$ is already reversely magnetized in order to indicate a particular marking. During the second pulse all those annular cores which are operated by the first pulse will be restored to their initial positions but only those bistable circuits VK1–VK$v$ the annular cores of which are operated by the first pulse, will be activated. All that is written in cores $e_N$–$e''_N$ is erased.

When the relay R1 is operated, a circuit was formed for the relay R3 through the contact 11, the wire $k2$, the contact device $y$ and the contact 10 in repeater DM. The relay R3 is so slow in operating that the above-mentioned first and second pulse have time to pass before relay R3 attracts its armature and operates the contacts 31–39. Furthermore, the signals from the bistable circuits OK–OK″ have time to be transmitted in circuits passing through the contacts 31–33 and wires in the bundles of wires U and K and the contact device $k$ from register AK to repeater DM before relay R3 attracts and operates the break contacts 31–33. When the contacts 34–36 are closed, circuit S will be completed from the bistable circuits OK–OK″ through the resistances $r1$–$r3$ and the reading wires $t_e$–$t_e''$. These circuits prevent the annular cores associated with the bistable circuits which have been activated by said first pulse, from being reversely magnetized by a third pulse having the same current direction as the first pulse.

The relay R2 is operated by means of the contacts 13 and 37. The contacts 21–22 are actuated again and a third pulse having the same current direction as the first pulse is sent out from a positive source +, through wires $t_o$, $t_N$, L1, contacts $x1$, $x$, $i$, the rectifier $b1$, the capacitor C1, the contacts 21, to a negative source. Due to this, the field direction in those annular cores $e_N$–$e''_N$ which correspond to bistable circuits OK–OK″ is reversed which bistable circuits were not activated at the first pulse. Thus, the particular markings that had been erased will be rewritten.

Some annular cores $g_1$–$g_n$, $a$–$d$, $p$–$v$ become also reversely magnetized, but this is of no importance as the bistable circuits VK1–VK$v$ are activated only by pulses having that current direction which exists during said second pulse.

After the recording in the bistable circuits VK1–VK$v$ has been transmitted to the signal repeater DM by means of wires in the bundle of wires U and contacts in the contact device $k$ the pulse generator PG will be released. The relay R1 releases its armature. The capacitor C2 is discharged by the resistance $r4$ and the contact 12. The relay R2 release its armature. The capacitor C1 is discharged by means of the resistance $r5$, the contact 22, the contact 38 and the rectifier $b2$ during the release time of the relay R3.

Writing and cancellation of particular markings on the individual annular cores $e_1$–$e''_1$ . . . $e_N$–$e''_N$ is carried out by means of contact devices Y1–Y$e$ in the signal repeaters DM and by means of marking wires $ty$–$ty''$ running parallelly with the reading wires $t_e$–$t_e''$ through the annular cores $e_1$–$e''_1$ . . . $e_N$–$e''_N$. The contact devices Y1–Y$e$ are actuated one by one and connect a signal wire Y1, Y2 and Y3 respectively to positive or negative battery voltage in relation to ground potential. At the writing, for example, positive and at cancellation negative battery voltage will be connected. Each of the contact devices Y1–Y3 corresponds to its separate particular marking which is written and cancelled respectively by taking a prefix before the subscriber's number that is intended by the marking. The resistances $r$–$r''$ in the circuits passing through the marking wires $ty$–$ty''$ have the same resistance as the resistances $r1$–$r3$ in the pulse generator PG, i.e., limit the currents to half the magnetomotive force that is required and which a pulse through a test wire $T1$–$T_N$ exerts on an annular core $e_1$–$e''_1$ . . . $e_N$–$e''_N$. The third pulse from pulse generator PG is inhibited at each writing and cancellation, respectively, by the fact that the contact 10 always interrupts the circuit of the relay R3 when one of the contact devices Y1–Y3 is actuated. Only the above-mentioned first and second pulse are thus sent from pulse generator PG at a writing and a cancellation respectively, and the annular core that is intended is magnetized by either of these pulses in the intended direction while the remaining pulse will be neutralized.

We claim:

1. In an automatic telephone exchange which includes registers responsive to numbers identifying a subscriber's line, for controlling connections between said lines via line equipment for each of said lines, the combination comprising an intermediate distribution frame having first and second sets of connecting points, each of the points of one of said sets of points being assigned a number representing the directory number of a subscriber's line, each of the points of the other of said sets of points being assigned a number representing at least the location of the line equipment of a subscriber's line, a plurality of jumper lines, each of said jumper lines connecting the point in the first set to the point in the second set associated with the same subscriber's line, a line selector having one input and a plurality of outputs whereby said one input is connected to a particular output in accordance with received control signals, a controllably actuatable pulse generator connected to the input of said line selector, a plurality of input lines, each of said input lines connecting one output of said line selector to one connecting point of said first set, respectively, a plurality of test lines, each of said test lines being connected to one connecting point of said second set respectively, a translator comprising a plurality of magnetic cores and reading windings coupled to said cores, each of said test wires being electromagnetically coupled to different combinations of said cores representing line location numbers, registering means for indicating and transmitting signals received from said reading windings, control means connectable to said registers for transmitting a number thereto or for receiving a number therefrom and generating a control signal when receiving a number from one of said registers to cause said line selector to select an output in accordance with said received directory number and for causing said pulse generator to emit a pulse whereby said pulse is transmitted to one of said test lines via said distribution frame so that said registering means receives a combination of signals representative of a line location number, means for connecting said registering means to said control means so that said line location number is transmittable thereby to one of said registers, at least one further magnetic core switchable between two stable magnetic states, said further magnetic core being electromagnetically coupled to one of said test lines for switching between said magnetic states in accordance with the polarity of a pulse passing through said one test line, a further reading winding coupled to said further magnetic core, a registering element connected to said further reading winding for transmitting a signal when said further magnetic core switches states in a first direction for indicating that the number associated with the test wire coupled to said further magnetic core requires special handling, and means responsive to the signal transmitted by said registering element to activate said pulse generator to thereafter emit another pulse on the selected test wire having such polarity to switch said further magnetic core in said second direction whereby said further magnetic core is reset to its original stable state.

2. The automatic telephone exchange of claim 1 wherein said registers include means for transmitting a prefix number before the directory number, and further comprising means controlling said pulse generator for changing the state of said further magnetic core when the number associated with the test wire coupled to said further magnetic core is preceded by a prefix number.

3. The automatic telephone exchange of claim 1 and further comprising an operator panel including at least one indicator means, said indicator means connectable to said registering element for giving an indication to an operator when said registering element records a particular direction of change of state of said further magnetic core whereby an operator is notified that said associated number requires special handling.

No references cited.

WILLIAM C. COOPER, Primary Examiner

U.S. Cl. X.R.

179—27